United States Patent
Matsui et al.

(10) Patent No.: US 7,503,967 B2
(45) Date of Patent: Mar. 17, 2009

(54) AZO COMPOUND, INK COMPOSITION AND COLORED ARTICLE

(75) Inventors: Takahiko Matsui, Kita-ku (JP); Hiroaki Ohno, Kita-ku (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 188 days.

(21) Appl. No.: 11/666,673

(22) PCT Filed: Nov. 10, 2005

(86) PCT No.: PCT/JP2005/020598

§ 371 (c)(1), (2), (4) Date: Apr. 26, 2007

(87) PCT Pub. No.: WO2006/051850

PCT Pub. Date: May 18, 2006

(65) Prior Publication Data

US 2008/0193660 A1 Aug. 14, 2008

(30) Foreign Application Priority Data

Nov. 12, 2004 (JP) ............................. 2004-328379

(51) Int. Cl.
*C09D 11/02* (2006.01)
*C09B 35/50* (2006.01)
*B41J 2/01* (2006.01)

(52) U.S. Cl. .................. 106/31.52; 534/806; 347/100

(58) Field of Classification Search ............. 106/31.52; 534/806; 347/100
See application file for complete search history.

(56) References Cited

U.S. PATENT DOCUMENTS

| | | | | |
|---|---|---|---|---|
| 4,395,288 | A * | 7/1983 | Eida et al. ................. | 106/31.51 |
| 5,530,105 | A * | 6/1996 | Yamazaki et al. ........ | 106/31.49 |
| 7,326,288 | B2 * | 2/2008 | Matsui et al. ............ | 106/31.52 |
| 7,462,228 | B2 * | 12/2008 | Ohno et al. ............. | 106/31.52 |
| 2003/0187236 | A1 | 10/2003 | Sawatari et al. ........... | 534/809 |
| 2006/0144288 | A1 | 7/2006 | Ohno et al. .............. | 106/31.27 |
| 2008/0292792 | A1* | 11/2008 | Matsui et al. ............... | 534/754 |

FOREIGN PATENT DOCUMENTS

| | | |
|---|---|---|
| JP | 62-109872 | 5/1987 |
| JP | 2003-183545 | 7/2003 |
| JP | 2003-201412 | 7/2003 |
| JP | 2004-285351 | 10/2004 |

OTHER PUBLICATIONS

International Search Report dated Feb. 7, 2006.

* cited by examiner

*Primary Examiner*—Helene Klemanski
(74) *Attorney, Agent, or Firm*—Nields, Lemack & Frame, LLC

(57) ABSTRACT

An azo compound represented by the following Formula (1) or a salt thereof, and an ink composition comprising the same

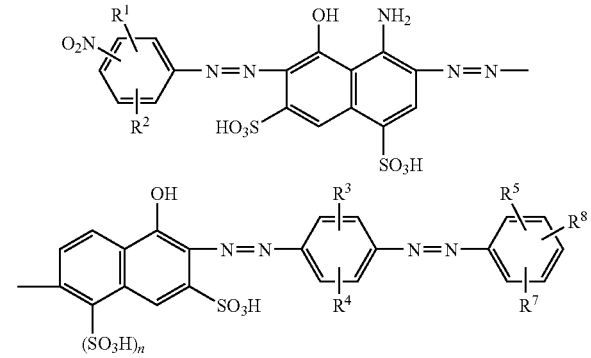

[KA 1]

(wherein, each of $R^1$, $R^2$, $R^5$, $R^6$ and $R^7$ independently represents a hydrogen atom, a carboxyl group, a sulfo group and the like, each of $R^3$ and $R^4$ independently represents a hydrogen atom, a sulfo group, a nitro group, a (C1 to C4) alkyl group (which may be substituted by a hydroxyl group or a (C1 to C4) alkoxy group), a (C1 to C4) alkoxy group (which may be substituted by a hydroxyl group, a (C1 to C4) alkoxy group, a sulfo group or a carboxyl group) and the like, and n represents 0 or 1, respectively).

12 Claims, No Drawings

AZO COMPOUND, INK COMPOSITION AND COLORED ARTICLE

TECHNICAL FIELD

The present invention relates to a novel azo compound or a salt thereof, an ink composition comprising the same, and colored article thereby.

BACKGROUND OF THE INVENTION

A method for recording by means of an inkjet printer, a typical method among various color recording methods, performs recording by generating ink droplets and depositing them onto various record-receiving materials (such as paper, film and cloth). This method has been rapidly prevailing lately and is expected to grow remarkably in the future because of such features as less noise generation due to no contact of a recording head with a record-receiving material and easiness in downsizing and speedup. Conventionally, as an ink for a fountain pen or a felt pen and an ink for inkjet recording, a water-based ink dissolving a water-soluble dye in an aqueous medium has been used, and in these water-based inks, a water-soluble organic solvent is generally added to prevent ink from clogging at a pen tip or an inkjet nozzle. For this reason, these conventional inks are required to provide a recorded image of sufficient density, not to clog at a pen tip or an inkjet nozzle, to dry quickly on a record-receiving material, to bleed less, and to have good storage stability, and also water-soluble dye to be used is required, in particular, to have high solubility in water and a water-soluble organic solvent to be added to the inks. Moreover, an image formed is required to have image fastness such as water fastness, light fastness, ozone gas fastness and moisture fastness.

Ozone gas fastness means durability against phenomenon that ozone gas having oxidizing property in the air reacts with a dye on a recording paper to incur discoloration or fading of a printed image. Although oxidizing gas having this kind of action includes NOx and SOx besides ozone gas, ozone gas is said to be a main causative substance to promote the phenomenon of discoloration or fading of an inkjet recorded image more strongly, among these oxidizing gases. For an ink-receiving layer provided at the surface of a photo quality inkjet paper, so as to dry the ink faster and decrease bleed in high quality image, porous white inorganic substance and the like are often used as materials. Discoloration or fading in color caused by ozone gas occurs noticeably on such recording papers.

As the phenomenon of discoloration or fading caused by oxidizing gas are characteristics of inkjet images, improvement of ozone gas fastness is one of the most important problems.

To extend application field of a printing method using ink in the future, an ink composition to be used for inkjet recording and a colored article thereby are strongly required to exhibit further improved light fastness, ozone gas fastness, moisture fastness and water fastness.

Among inks with various hues prepared from various dyes, a black ink is an important one used for both of mono color and full color images. A lot of dyes for a black ink have been proposed so far, but one fully meeting the requirements of the marketplace has not been provided yet. Many of coloring matters proposed are disazo coloring matters, having such problems that hues are too shallow (reddish black), a color rendering property (a property of hue changing depending on a light source) is increased, water fastness and moisture fastness are inferior, gas fastness is not sufficient, and the like. Similarly, a great number of azo metal-complex coloring matters proposed have also such problems that they contain metal ion and considerations about safety of human bodies and environments are not included sufficiently, ozone gas fastness is not sufficient, and the like. In order to make the hue deeper, studies on polyazo coloring matter with the conjugate system increased have been done, but there still remain such problems that their hue density is low, the storage stability of aqueous solution and ink is inferior because their water solubility is low, their ozone gas fastness is not sufficient, and the like.

As a compound (coloring matter) for black ink for inkjet improved on ozone gas fastness which has been becoming one of the most important problems recently, for example, one described in Patent Literature 1 can be cited. The ozone gas fastness of these compounds, however, doesn't meet the requirements of the marketplace sufficiently. Furthermore, as a coloring matter compound for black ink, a trisazo compound is described in Patent Literature 2 and 3, but doesn't meet the requirements of the marketplace sufficiently, especially requirements on ozone gas fastness.

Patent Literature 1: JP 2003-183545 A
Patent Literature 2 JP 62-109872 A
Patent Literature 3: JP 2003-201412 A

DISCLOSURE OF THE INVENTION

Problems to Be Solved by the Invention

An object of the present invention is to provide a compound for black ink which has high solubility in medium whose main component is water and stability in long-term storage of high concentrated aqueous dye solution and ink, exhibits high density of a printed image, gives a recorded image of black color superior in fastnesses of a printed image, especially ozone gas fastness and makes it easy and inexpensive to synthesize, and an ink composition thereof.

Means of Solving the Problems

The inventors of the present invention intensively studied a way to solve the above problems and have completed the present invention. That is, the present invention relates to:

(1) An azo compound represented by Formula (1) as shown below or a salt thereof,

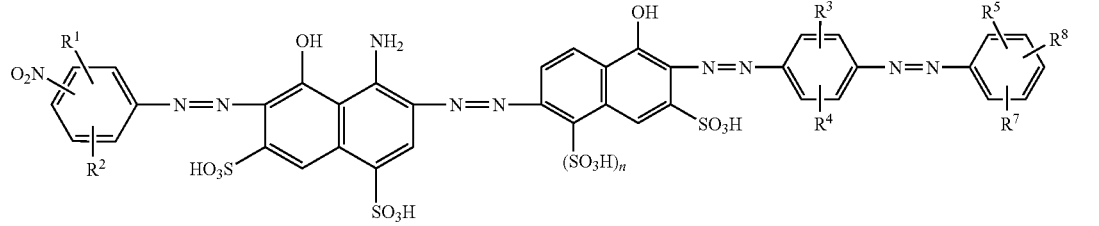

[KA 1]

(wherein, each of $R^1$, $R^2$, $R^5$, $R^6$ and $R^7$ independently represents a hydrogen atom, a halogen atom, a cyano group, a hydroxyl group, a carboxyl group, a sulfo group, a sulfamoyl group, an N-alkylaminosulfonyl group, an N-phenylaminosulfonyl group, a (C1 to C4) alkylsulfonyl group which may be substituted by a hydroxyl group, a phospho group, a nitro group, an acyl group, a ureide group, a (C1 to C4) alkyl group (which may be substituted by a hydroxyl group or a (C1 to C4) alkoxy group), a (C1 to C4) alkoxy group (which may be substituted by a hydroxyl group, a (C1 to C4) alkoxy group, a sulfo group or a carboxyl group), an acylamino group, an alkylsulfonylamino group or a phenylsulfonylamino group (a phenyl group may be substituted by a halogen atom, an alkyl group or a nitro group), each of $R^3$ and $R^4$ independently represents a hydrogen atom, a halogen atom, a cyano group, a carboxyl group, a sulfo group, a nitro group, a (C1 to C4) alkyl group (which may be substituted by a hydroxyl group or a (C1 to C4) alkoxy group), a (C1 to C4) alkoxy group (which may be substituted by a hydroxyl group, a (C1 to C4) alkoxy group, a sulfo group or a carboxyl group), an acylamino group, an alkylsulfonylamino group or a phenylsulfonylamino group (a phenyl group may be substituted by a halogen atom, an alkyl group or a nitro group), and n represents 0 or 1, respectively)

(2) The azo compound or the salt thereof according to the above aspect (1) wherein $R^1$ is a carboxyl group or a sulfo group, $R^2$ is a hydrogen atom, $R^6$ is a carboxyl group or a sulfo group, and n is 1, (3) The azo compound or the salt thereof according to the above aspect (1) or (2), wherein $R^1$ is a sulfo group, the substitution position of a nitro group is at the para-position to an azo group when the substitution position of $R^1$ is at the ortho-position to an azo group, and the substitution position of a nitro group is at the ortho-position to an azo group when the substitution position of $R^1$ is at the para-position to an azo group, (4) The azo compound or the salt thereof according to any one of the above aspects (1) to (3), wherein $R^3$ is a sulfo group, $R^4$ is a hydrogen atom, $R^5$ is a hydrogen atom, a carboxyl group or a sulfo group, and $R^7$ is a hydrogen atom, (5) An azo compound represented by Formula (2) as shown below or a salt thereof, (6) An ink composition characterized by comprising at least one kind of the azo compound or the salt thereof according to any one of the above aspects (1) to (5), (7) A recording method for inkjet printing using the ink composition according to the above aspect (6), (8) The recording method for inkjet printing wherein a record-receiving material in the method for inkjet printing according to the above aspect (7) is a sheet for transmitting information, (9) The recording method for inkjet printing characterized by that the sheet for transmitting information according to the above aspect (8) comprises porous white inorganic substance,

(10) An inkjet printer which is loaded with a container comprising the ink composition according to the above aspect (6),

(11) A colored article which is colored with the azo compound or the salt thereof according to any one of the above aspects (1) to (5).

Effect of the Invention

An azo compound of the present invention and a salt thereof (hereinafter, the both of an azo compound and a salt thereof are got together to be referred to as an azo compound for simplicity) have excellent water-solubility, therefore a filtration property with a membrane filter during production steps of an ink composition is favorable, and it exhibits excellent stability in storage of a recording liquid and jet stability. Furthermore, an ink composition comprising an azo compound of the present invention does not exhibit crystal deposition, change in physical property, or color change after storage for a long period of time, and exhibits favorable storage stability. In addition, an ink composition comprising an azo compound of the present invention is used for inkjet recording and for writing tools, providing the high printing density of a recorded image made on a plain paper and an inkjet paper and excellent properties in various fastnesses, particularly in ozone gas fastness. Using it together with dyes of magenta, cyan, and yellow allows full color inkjet recording that provides excellence in various fastnesses and storage stability. Thus an ink composition of the present invention is extremely useful as a black ink for inkjet recording.

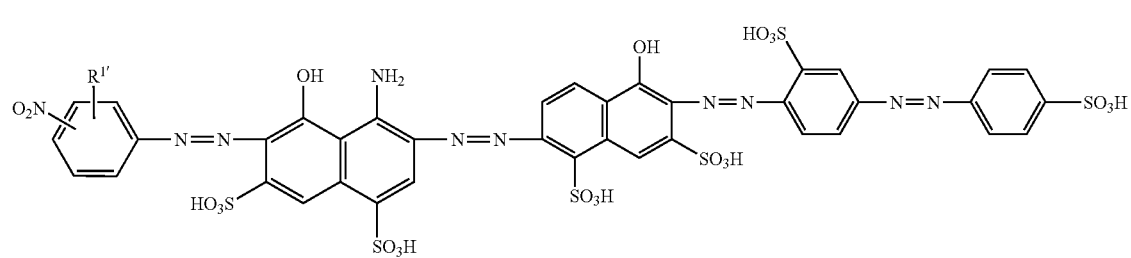

[KA 2]

(wherein, $R^{1'}$ is a sulfo group, the substitution position of a nitro group is at the para-position to an azo group when the substitution position of $R^{1'}$ is at the ortho-position to an azo group, and the substitution position of a nitro group is at the ortho-position to an azo group when the substitution position of $R^{1'}$ is at the para-position to an azo group)

BEST MODE FOR CARRYING OUT THE INVENTION

The present invention will be described in detail hereinafter.

In the present invention, the number of carbons in an alkyl group, an alkoxy group, an acyl group and the like which are not specified about the number of carbons is not particularly limited in the range of achieving the effect of the present invention, but usually about 1 to 20, preferably about 1 to 10, further preferably about 1 to 4 in the case of an alkyl group, an alkoxy group or an aliphatic acyl group and about 7 to 11 in the case of an aromatic acyl group, and specifically a benzoyl group, a naphthoyl group, and the like can be included.

For $R^1$, $R^2$, $R^5$, $R^6$ and $R^7$ in Formula (1), examples of an N-alkylaminosulfonyl group include, for example, an N-methylaminosulfonyl group, an N-ethylaminosulfonyl group, an N-(n-butyl)aminosulfonyl group, an N,N-dimethylaminosulfonyl group, an N,N-di(n-propyl)aminosulfonyl group and the like.

For $R^1$, $R^2$, $R^5$, $R^6$ and $R^7$ in Formula (1), examples of a (C1 to C4) alkylsulfonyl group which may be substituted by a hydroxyl group include, for example, methylsulfonyl, ethylsulfonyl, propylsulfonyl, butylsulfonyl, hydroxyethylsulfonyl, 2-hydroxypropylsulfonyl and the like.

For $R^1$, $R^2$, $R^5$, $R^6$ and $R^7$ in Formula (1), preferable examples of an acyl group include, for example, (C1 to C4) alkylcarbonyl such as acetyl, propionyl, butyryl or isobutyryl, (C7 to C11) aromatic carbonyl such as benzoyl and naphthoyl, and the like.

For $R^1$ to $R^7$ in Formula (1), examples of a (C1 to C4) alkyl group which may be substituted by a hydroxyl group or a (C1 to C4) alkoxy group include, for example, methyl, ethyl, n-propyl, isopropyl, n-butyl, isobutyl, sec-butyl, tert-butyl, 2-hydroxyethyl, 2-hydroxypropyl, 3-hydroxypropyl, methoxyethyl, 2-ethoxyethyl, n-propoxyethyl, isopropoxyethyl, n-butoxyethyl, methoxypropyl, ethoxypropyl, n-propoxypropyl, isopropoxybutyl, n-propoxybutyl, and the like.

For $R^1$ to $R^7$ in Formula (1), examples of a (C1 to C4) alkoxy group which may be substituted by a substituent selected from the group consisting of a hydroxy group, a (C1 to C4) alkoxy group, a sulfo group and a carboxyl group include, for example, methoxy, ethoxy, n-propoxy, isopropoxy, n-butoxy, sec-butoxy, tert-butoxy, 2-hydroxyethoxy, 2-hydroxypropoxy, 3-hydroxypropoxy, methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, n-propoxybutoxy, 2-hydroxyethoxyethoxy, carboxymethoxy, 2-carboxyethoxy, 3-carboxypropoxy, 3-sulfopropoxy, 4-sulfobutoxy, and the like.

For $R^1$ to $R^7$ in Formula (1), as an preferable acyl group of an acylamino group, for example, the preferable acyl groups cited in the above section of an acyl group can be included, and a preferable acylamino group includes, for example, acetylamino, propionylamino, butyrylamino, isobutyrylamino, benzoylamino, naphthoylamino, and the like.

For $R^1$ to $R^7$ in Formula (1), preferable examples of an alkylsulfonylamino group include, for example, methylsulfonylamino, ethylsulfonylamino, propylsulfonylamino, and the like.

For $R^1$ to $R^7$ in Formula (1), preferable examples of a phenylsulfonylamino group which may be substituted by a group selected from the group consisting of a halogen atom, an alkyl group and a nitro group include, for example, benzenesulfonylamino, toluenesulfonylamino, chlorobenzenesulfonylamino, nitrobenzenesulfonylamino, and the like.

Each of preferable $R^1$ and $R^2$ in Formula (1) is independently a hydrogen atom, a chlorine atom, a bromine atom, a cyano group, a carboxyl group, a sulfo group, a sulfamoyl group, an N-methylaminosulfonyl group, an N-phenylaminosulfonyl group, a methylsulfonyl group, a hydroxyethylsulfonyl group, a phosphate group, a nitro group, an acetyl group, a benzoyl group, a ureide group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, a benzoylamino group and the like, further preferably, a hydrogen atom, a chlorine atom, a cyano group, a sulfamoyl group, an acetyl group, a nitro group, a carboxyl group or a sulfo group, more preferably, a hydrogen atom, a carboxyl group or a sulfo group.

More preferable $R^1$ is a carboxyl group or a sulfo group, and a sulfo group is especially preferable. $R^2$ is especially preferably a hydrogen atom.

It is preferable that the substitution position of a nitro group is at the para-position to an azo group when the substitution position of $R^1$ is at the ortho-position to an azo group, and the substitution position of nitro group is at the ortho-position to an azo group when the substitution position of R1 is at the para-position to an azo group.

Each of preferable $R^3$ and $R^4$ in Formula (1) is independently a hydrogen atom, a cyano group, a carboxyl group, a sulfo group, a nitro group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group or an acetylamino group, more preferably, a hydrogen atom, a carboxyl group, a sulfo group, a methyl group, a methoxy group or a 3-sulfopropoxy group, further preferably, a hydrogen atom or sulfo group. Moreover, the combination in which $R^3$ is a sulfo group and $R^4$ is a hydrogen atom is especially preferable.

Each of preferable $R^5$ to $R^7$ in Formula (1) is independently a hydrogen atom, a chlorine atom, a bromine atom, a cyano group, a carboxyl group, a sulfo group, a sulfamoyl group, an N-methylaminosulfonyl group, an N-phenylaminosulfonyl group, a methylsulfonyl group, a hydroxyethylsulfonyl group, a phosphate group, a nitro group, an acetyl group, a benzoyl group, a ureide group, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, an acetylamino group, a benzoylamino group or the like, further preferably, a hydrogen atom, a chlorine atom, a cyano group, a sulfamoyl group, an acetyl group, a nitro group, a carboxyl group or a sulfo group, more preferably, a hydrogen atom, a carboxyl group or a sulfo group.

Especially preferable $R^5$ is a hydrogen atom, a carboxyl group or a sulfo group, especially preferable $R^6$ is a carboxyl group or a sulfo group, and especially preferable $R^7$ is a hydrogen atom.

For $R^1$ and $R^2$, preferably one is a hydrogen atom or a sulfo group and the other is a carboxyl group, a sulfo group or a (C1 to C4) alkoxy group, more preferably, one is a hydrogen atom and the other is a carboxyl group or a sulfo group. n may be any of 0 or 1, but 1 is preferable.

For $R^3$ and $R^4$, preferably one is a sulfo group or a sulfo (C1 to C4) alkoxy group and the other is a hydrogen atom, a sulfo group or a (C1 to C4) alkyl group, more preferably, one is a sulfo group and the other is a hydrogen atom.

For $R^5$, $R^6$ and $R^7$, preferably, any one of them is one selected from the group consisting of a sulfo group, a carboxyl group, a sulfopropoxy group, a hydroxyl group and a hydroxy (C1 to C4) alkylsulfonyl group, more preferably, a sulfo group or a carboxyl group, further preferably, a sulfo group, other any one is a hydrogen atom, a sulfo group, a carboxyl group, a (C1 to C4) alkyl group, a nitro group or an aminosulfonyl group, more preferably, a hydrogen atom, a sulfo group or a carboxyl group, and the rest is a hydrogen atom, a sulfo group, a toluenesulfonyl amino group or an acetylamino group, more preferably, a hydrogen atom.

A combination of these preferable ones is more preferable, a combination of preferable ones and more preferable ones is further preferable, and a combination of more preferable ones is the most preferable.

Salts of the compounds as shown in the above formulas (1) and (2) are inorganic or organic cationic ones. Specific examples of an inorganic salt among them include an alkali metal salt, an alkaline earth metal salt and an ammonium salt, preferably, salts of lithium, sodium, and potassium and an ammonium salt, and a preferable organic cationic salt includes, for example, a salt of the compound as shown by the following Formula (3), but not limited thereto.

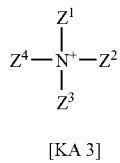

(3)

[KA 3]

For $Z^1$, $Z^2$, $Z^3$ and $Z^4$ in Formula (3), examples of an alkyl group include methyl, ethyl, n-propyl, isopropyl, n-butyl, isobutyl, sec-butyl, tert-butyl and the like, examples of a hydroxyalkyl group include a hydroxy-(C1 to C4) alkyl group such as a hydroxymethyl group, a hydroxyethyl group, a 3-hydroxypropyl group, a 2-hydroxypropyl group, a 4-hydroxybutyl group, a 3-hydroxybutyl group, and a 2-hydroxybutyl group, examples of a hydroxyalkoxyalkyl group include a hydroxyl (C1 to C4) alkoxy-(C1 to C4) alkyl group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group, a 2-hydroxyethoxybutyl group, and a hydroxyethoxy-(C1 to C4) alkyl group is preferable among them. Especially preferable ones include a hydrogen atom; methyl group; a hydroxyl-(C1 to C4) alkyl group such as a hydroxymethyl group, a hydroxyethyl group, a 3-hydroxypropyl group, a 2-hydroxypropyl group, a 4-hydroxybutyl group, a 3-hydroxybutyl group, a 2-hydroxybutyl group; and a hydroxyethoxy-(C1 to C4) alkyl group such as a hydroxyethoxymethyl group, a 2-hydroxyethoxyethyl group, a 3-hydroxyethoxypropyl group, a 2-hydroxyethoxypropyl group, a 4-hydroxyethoxybutyl group, a 3-hydroxyethoxybutyl group and a 2-hydroxyethoxybutyl group.

Specific examples of $Z^1$, $Z^2$, $Z^3$ and $Z^4$ in Formula (3) are shown in Table 1.

The azo compound of the present invention as shown in Formula (1) can be synthesized, for example, in the following method. And a structural formula of a compound in each step is to be represented in free acid form.

The Following Formula (4)

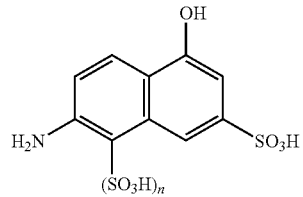

(4)

[KA 4]

(wherein, n has the same meaning as in Formula (1))

and p-toluenesulfonylchloride are reacted in the presence of alkali to obtain a compound represented by Formula (5),

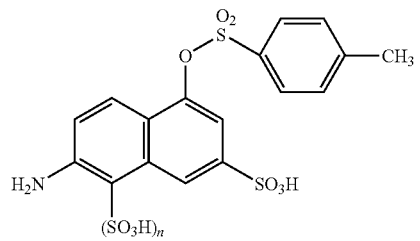

(5)

[KA 5]

(wherein, n has the same meaning as above) which compound is then diazotized in a conventional manner and subjected to a coupling reaction with 4-amino-5-naphthol-1,7-disulfonic acid under acidic conditions to obtain a compound represented by Formula (6).

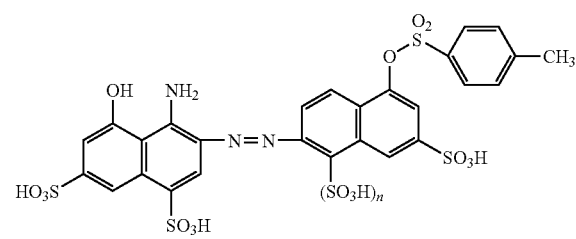

(6)

[KA 6]

(wherein, n has the same meaning as above)

TABLE 1

| Compound No. | $Z^1$ | $Z^2$ | $Z^3$ | $Z^4$ |
|---|---|---|---|---|
| 1-1 | H | —C2H4OH | —C2H4OH | —C2H4OH |
| 1-2 | CH3 | —C2H4OH | —C2H4OH | —C2H4OH |
| 1-3 | H | —CH2CH(OH)CH3 | —CH2CH(OH)CH3 | —CH2CH(OH)CH3 |
| 1-4 | CH3 | —CH2CH(OH)CH3 | —CH2CH(OH)CH3 | —CH2CH(OH)CH3 |
| 1-5 | H | —C2H4OH | H | —C2H4OH |
| 1-6 | CH3 | —C2H4OH | H | —C2H4OH |
| 1-7 | H | —CH2CH(OH)CH3 | H | —CH2CH(OH)CH3 |
| 1-8 | CH3 | —CH2CH(OH)CH3 | H | —CH2CH(OH)CH3 |
| 1-9 | CH3 | —C2H4OH | CH3 | —C2H4OH |
| 1-10 | CH3 | —CH2CH(OH)CH3 | CH3 | —CH2CH(OH)CH3 |

The resultant compound represented by Formula (6) is subjected to a coupling reaction with a compound which is obtained by diazotizing a compound represented by the following Formula (7)

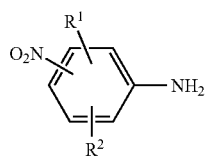

[KA 7]

(wherein, $R^1$ and $R^2$ have the same meanings as in Formula (1))

in a conventional manner, to obtain a compound represented by the following Formula (8).

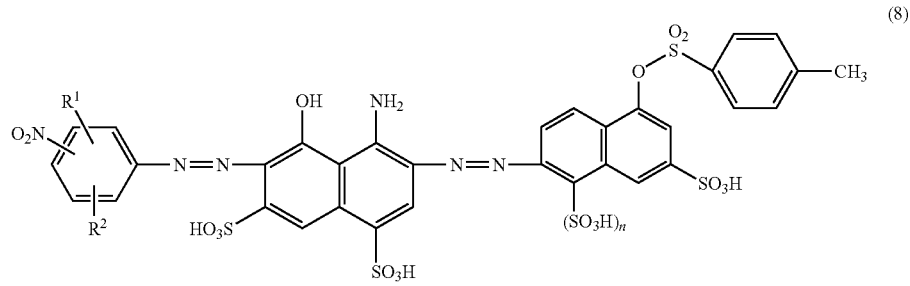

[KA 8]

(wherein, $R^1$, $R^2$ and n have the same meanings as above)

The resultant compound represented by Formula (8) is hydrolyzed under alkaline conditions to obtain a compound represented by the following Formula (9).

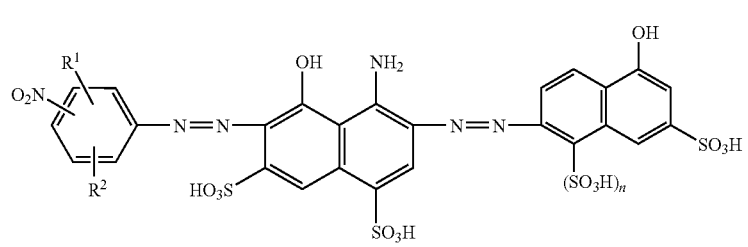

[KA 9]

(wherein, $R^1$, $R^2$ and n have the same meanings as above)

This compound is subjected to a coupling reaction with a compound which is obtained by diazotizing a monoazo compound represented by Formula (10)

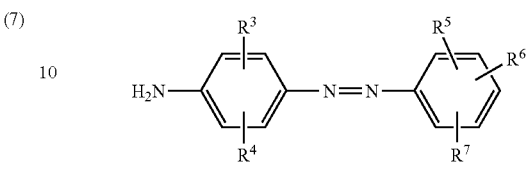

[KA 10]

(wherein, $R^3$ to $R^7$ have the same meanings as in Formula (1))

in a conventional manner to obtain an azo compound of the present invention represented by Formula (1) or a salt thereof.

The monoazo compound of Formula (10) can be synthesized in a conventional manner.

For example, a compound represented by the following Formula (11)

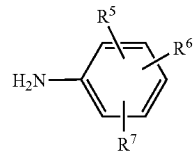

[KA 11]

(wherein, $R^5$, $R^6$ and $R^7$ have the same meanings as in Formula (1))

is diazotized in a conventional manner, and then said diazotized compound and a compound represented by Formula (12)

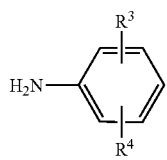

[KA 11]

(wherein $R^3$ and $R^4$ have the same meanings as in Formula (1))

are then subjected to a coupling reaction to obtain a monoazo compound of Formula (10). Alternatively, a compound represented by the following Formula (13)

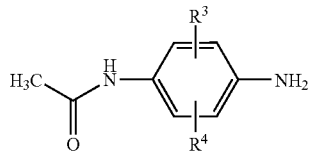

[KA 12]

(wherein, $R^3$ and $R^4$ have the same meanings as above)

is diazotized in a conventional manner, and then said diazotized compound and a compound represented by Formula (14)

(wherein, $R^5$ to $R^7$ have the same meanings as above)

are subjected to a coupling reaction to obtain a compound of the following Formula (15).

(wherein, $R^3$ to $R^7$ have the same meanings as above)

The resultant compound of Formula (15) can be also hydrolyzed under acidic or alkaline conditions to obtain a monoazo compound of Formula (10).

For favorable examples of the compound shown in formula (1), not particularly limited, but the following structures are specifically included.

[Table 2]

TABLE 2

| Compound No. | Structural Formula |
|---|---|
| 1 | |

TABLE 2-continued
| Compound No. | Structural Formula |
|---|---|
| 2 | 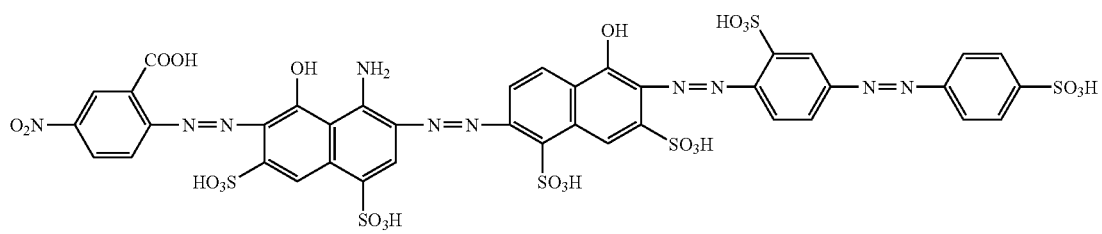 |
| 3 | 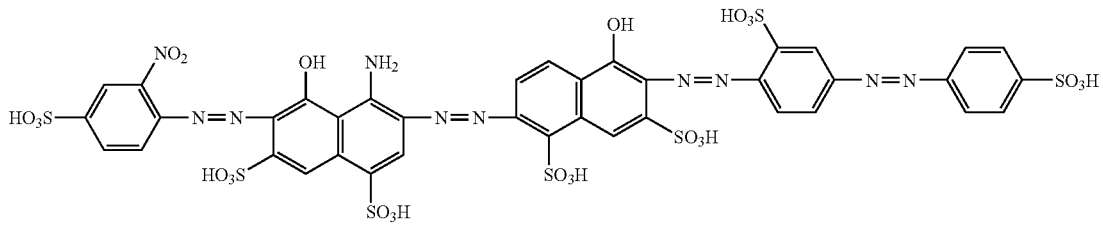 |
| 4 | 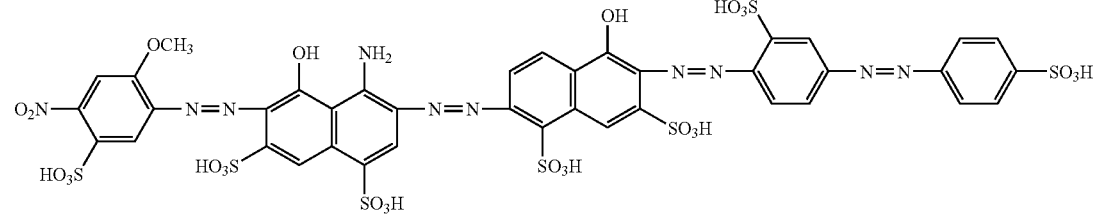 |
| 5 | 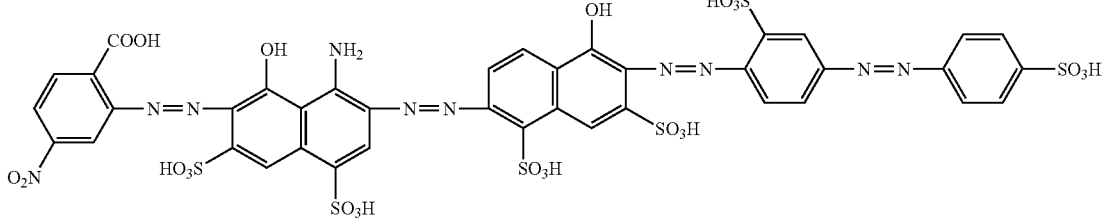 |
| 6 | 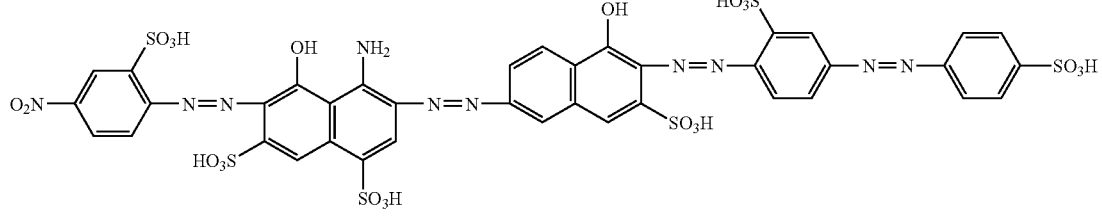 |
| 7 | 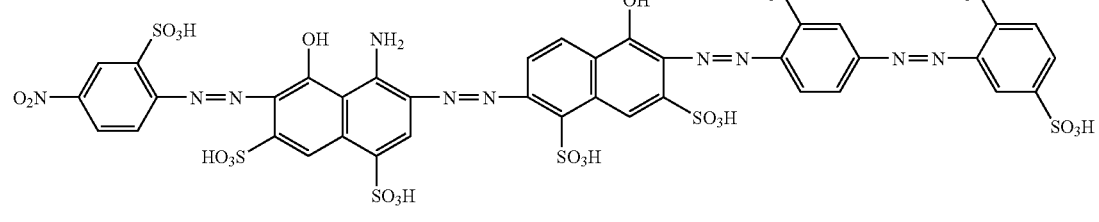 |

TABLE 3

| Compound No. | Structural Formula |
|---|---|
| 8 | (structure) |
| 9 | (structure) |
| 10 | (structure) |
| 11 | (structure) |
| 12 | (structure) |
| 13 | (structure) |

TABLE 3-continued

| Compound No. | Structural Formula |
| --- | --- |
| 14 | (structure) |

TABLE 4

| Compound No. | Structural Formula |
| --- | --- |
| 15 | (structure) |
| 16 | (structure) |
| 17 | (structure) |
| 18 | (structure) |

TABLE 4-continued

| Compound No. | Structural Formula |
|---|---|
| 19 | (structural formula) |
| 20 | (structural formula) |
| 21 | (structural formula) |

Esterification reaction of a compound of Formula (4) and p-toluenesulphonylchloride is carried out by a known method per se, favorably conducted in an aqueous or aqueous organic medium, for example, at a temperature of 20 to 100° C., preferably 30 to 80° C., and at neutral to alkaline pH value. It is preferably carried out at neutral to weakly alkaline pH value, for example, at pH 7 to 10. Adjustment of this pH value is carried out by the addition of a base. As a base, for example, a hydroxide of an alkali metal such as lithium hydroxide and sodium hydroxide, a carbonate salt of an alkali metal such as lithium carbonate, sodium carbonate and potassium carbonate, or an acetate salt such as sodium acetate can be used. A compound of Formula (4) and p-toluenesulfonyl chloride are used in nearly stoichiometric amounts.

Diazotization of a compound of Formula (5) is carried out by a known method per se, for example, in an inorganic acid medium, for example, at a temperature of −5 to 30° C., preferably 5 to 15° C., using a nitrite salt, for example, a nitrite salt of an alkali metal such as sodium nitrite. Coupling of a diazotized compound of a compound of Formula (5) and 4-amino-5-naphtol-1,7-disulfonic acid is carried out under known conditions per se. It is favorable to conduct in an aqueous or aqueous organic medium, at a temperature of −5 to 30° C., preferably 5 to 25° C., and at acidic to neutral pH value, preferably at acidic to weakly acidic pH value, for example, at pH 1 to 4. As a mixed solution (coupling bath) comprising the above diazotized compound and the above disulphonic acid shows relatively strong acidic properties, a coupling reaction is preferably conducted at the pH value adjusted to the above. The adjustment of the pH value is carried out by addition of a base. As a base, for example, an alkali metal hydroxides such as lithium hydroxide and sodium hydroxide; an alkali metal carbonate salt such as lithium carbonate, sodium carbonate and potassium carbonate; an acetate salt such as sodium acetate; an ammonia; an organic amine and the like can be used. The compound of Formula (5) and 4-amino-5-naphtol-1,7-disulfonic acid are used in nearly stoichiometric amounts.

Diazotization of a compound of Formula (7) is also carried out by a known method per se, for example, in an inorganic acid medium, for example, at a temperature of −5 to 30° C., preferably 0 to 15° C., using a nitrite salt, for example, an alkali metal nitrite salt such as sodium nitrite. Coupling of a diazotized compound of a compound of Formula (7) and a compound of Formula (6) is also carried out under known conditions per se. It is favorable to conduct in an aqueous or aqueous organic medium, for example, at a temperature of −5 to 30° C., preferably 10 to 25° C., and at weakly acidic to alkaline pH value. It is preferably carried out at weakly acidic to weakly alkaline pH value, for example, at pH 5 to 10, and adjustment of the pH value is carried out by the addition of a base. As a base, for example, an alkali metal hydroxide such as lithium hydroxide and sodium hydroxide; an alkali metal carbonate salt such as lithium carbonate, sodium carbonate and potassium carbonate; an acetate salt such as sodium acetate; an ammonia; an organic amine and the like can be used. The compounds of Formula (6) and (7) are used in nearly stoichiometric amounts.

Production of a compound of Formula (9) by hydrolyzing a compound of Formula (8) is also carried out by a known method per se. Favorable is a method of heating in an aqueous alkaline medium, which is carried out, for example, by the addition of sodium hydroxide or potassium hydroxide into a solution containing a compound of Formula (8) to adjust the pH at 9.5 or higher, followed by heating, for example, at a temperature of 20 to 150° C., preferably 30 to 100° C. The pH value of the reaction solution at this time is preferably maintained at 9.5 to 11.5. Adjustment of this pH value is carried out by the addition of a base. The bases mentioned above can be used.

Diazotization of a compound of Formula (10) is also carried out by a known method per se, for example, in an inorganic acid medium, for example, at a temperature of −5 to 30° C., preferably 0 to 15° C., using a nitrite salt, for example, an alkali metal nitrite salt such as sodium nitrite. Coupling of a diazotized compound of the compound of Formula (10) and a compound of Formula (9) is also carried out under known conditions per se. It is favorable to conduct in an aqueous or aqueous organic medium, for example, at a temperature of −5 to 30° C., preferably 10 to 25° C. and at weakly acidic to alkaline pH value. It is preferably carried out at weakly acidic to weakly alkaline pH value, for example, at pH 5 to 10, and adjustment of the pH value is carried out by the addition of a base. As a base, for example, an alkali metal hydroxide such as lithium hydroxide and sodium hydroxide; an alkali metal carbonate salt such as lithium carbonate, sodium carbonate and potassium carbonate; an acetate salt such as sodium acetate; an ammonia; an organic amine; and the like can be used. The compounds of Formula (9) and (10) are used in nearly stoichiometric amounts.

An azo compound shown in Formula (1) according to the present invention, after a coupling reaction, can be filtration-separated as the precipitation in a free acid form by the addition of a mineral acid. The isolated compound can be washed by water or acidified water to eliminate inorganic salt which is contained in said compound. Thus obtained acidic-type coloring matter having a low percentage of inorganic salt content can be neutralized with an optional inorganic or organic base in an aqueous medium to be a corresponding salt solution. Examples of an inorganic base include, for example, a hydroxide of an alkali metal such as lithium hydroxide, sodium hydroxide and potassium hydroxide; ammonium hydroxide; a carbonate salt of an alkali metal such as lithium carbonate, sodium carbonate and potassium carbonate; and the like, and examples of an organic base include, an organic amine, for example, alkanolamine such as diethanolamine and triethanolamine, and the like, but not limited thereto.

An azo compound represented by the above Formula (1) of the present invention obtained above can be widely utilized for dyeing, ink and the like. Typically, the compound can be used as an aqueous composition containing the compound, for example, an aqueous composition for dyeing or a water-based ink composition for jet printing, writing tools or the like, and the like. For dyeing, for example, the compound can be used to dye materials composed of cellulose, and the like. The compound can be also used to dye other materials having carbonamide bonds, and be used for a wide range of dyeing leather, textile and paper.

An aqueous composition containing a compound of the present invention includes an aqueous composition consisting of 0.1 to 30% (mass: hereinafter, the same unless otherwise specified), preferably 0.1 to 20%, more preferably 1 to 10% of an compound of the present invention based on said whole aqueous composition; 0 to 20%, preferably 0 to 10% of additives added if required, based on said whole aqueous composition; and the rest of water or an aqueous medium.

The most typical method for using a compound of the present invention includes an ink composition where a compound of the present invention is dissolved in a liquid medium, preferably an aqueous liquid medium.

An ink composition of the present invention will be explained.

A reaction solution containing an azo compound of the present invention shown by the above Formula (1) can be directly used to produce an ink composition. Otherwise, this solution can be first subjected to drying, for example, spray drying to isolate an azo compound; salting out with inorganic salts such as sodium chloride, potassium chloride, calcium chloride and sodium sulfate; aciding out with mineral acid such as hydrochloric acid, sulfuric acid and nitric acid; or aciding-salting out which is a combination of the above described salting-out and aciding-out, to separate an azo compound of the present invention, and then the azo compound can be processed into an ink composition.

An ink composition of the present invention is a composition whose main medium is water, characterized by containing typically 0.1 to 20 mass %, preferably 1 to 10 mass %, and more preferably 2 to 8 mass % of an azo compound of the present invention shown by Formula (1). The rest of the ink composition of the present invention other than an azo compound of the present invention may be only water, however, for example, 0 to 30 mass % of a water-soluble organic solvent and, for example, 0 to 5 mass % of an ink preparation agent may be contained, and in the case of containing them, the rest other than them and an azo compound of the present invention is water. In this connection, the ink composition, in view of improving storage stability, has preferably a pH of 5 to 11, more preferably a pH of 7 to 10. In addition, the ink composition has preferably a surface tension of 25 to 70 mN/m, more preferably 25 to 60 mN/m. Furthermore, the ink composition has preferably a viscosity of not higher than 30 mPa·s, more preferably not higher than 20 mPa·s.

An ink composition of the present invention is one obtained by dissolving an azo compound shown by the above Formula (1) in water, an aqueous medium (a mixed solution of water and water-soluble organic solvent), or a water-soluble organic solvent (water-miscible organic solvent), and if required, by the addition of an ink preparation agent. When this ink composition is used as an ink for an inkjet printer, it is preferable to use a compound of the present invention containing less content of inorganic substance such as a chloride of metal cation, a sulfate salt and the like, and the content is, for example, not more than about 1 mass % (based on the coloring matter) only as guide. To produce an azo compound of the present invention containing less inorganic substance, for example, desalting treatment may be conducted by a method such as an ordinary reverse osmosis method, a method by which a dried material or a wet cake of an azo compound of the present invention is stirred in a mixed solvent of an alcohol such as methanol and water, filtration-separated, and dried, or the like. These desalting treatments may be repeated more than once, if required.

A water-soluble organic solvent which can be used in preparation of the above ink composition includes, for example, a (C1 to C4) alkanol such as methanol, ethanol, propanol, isopropanol, butanol, isobutanol, sec-butanol and tert-butanol; a carboxylic acid amide such as N,N-dimethylformamide or N,N-dimethylacetamide; a lactam such as 2-pyrrolidone and N-methylpyrrolidine-2-one; cyclic ureas such as 1,3-dimethylimidazolidine-2-one or 1,3-dimethylhexahydropyrimid-2-one; a ketone or a ketoalcohol such as acetone, methylethylketone and 2-methyl-2-hydroxypentane-4-one; a cyclic ether such as tetrahydrofuran and dioxane; a mono-, oligo- or polyalkylene glycol or thio glycol having (C2 to C6) alkylene units such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thio diglycol and dithio diglycol; a polyol (triol) such as glycerin, and hexane-1,2,6-triol; a (C1 to C4) alkyl ether of a polyhydric alcohol such as ethylene glycol monomethyl ether or ethylene glycol monoethyl ether, diethylene glycol monomethyl ether or diethylene glycol monoethyl ether or triethylene glycol monomethyl ether or triethyleneglycol monoethyl ether; gamma-butylolactone; dimethylsulfoxide; and the like. These organic solvents may be used alone or in a combination of two or more kinds thereof.

An ink preparation agent to be used in preparing the above ink composition includes, for example, an antiseptic and fungicide, a pH modifier, a chelating agent, an antirust agent, a water-soluble ultraviolet absorber, a water-soluble polymer compound, a dye-dissolving agent, an antioxidant, a surfactant, and the like.

The above fungicide includes sodium dehydroacetate, sodium benzoate, sodium pyridinethion-1-oxide, ethyl p-hydroxybenzoate, 1,2-benzisothiazolin-3-one and a salt thereof, and the like. These are preferably used at 0.02 to 1.00 mass % in the ink composition.

The antiseptic includes a compound of, for example, an organic sulfur base, an organic nitrogen sulfur base, an organic halogen base, a haloallylsulfone base, an iodopropargyl base, an N-haloalkylthio base, a nitrile base, a pyridine base, an 8-oxyquinoline base, a benzothiazole base, an isothiazoline base, a dithiol base, a pyridineoxide base, a nitropropane base, an organotin base, a phenol base, a quarternary ammonium salt base, a triazine base, a thiazine base, an anilide base, an adamantane base, a dithiocarbamate base, a brominated indanone base, a benzylbromoacetate base and an inorganic salt base. The compound of an organic halogen base includes, for example, sodium pentachlorophenol, the compound of a pyridineoxide base includes, for example, sodium 2-pyridinethiol-1-oxide, and the compound of an inorganic salt base includes, for example, anhydrous sodium acetate, and the compound of an isothiazoline base includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride and the like. Other antiseptic and fungicides include sodium sorbate, sodium benzoate, and the like.

As a pH modifier, any substance can be used as long as it can control the pH of an ink in the range of, for example, 5 to 11, without impairing an ink to be formulated. An example of the pH modifier includes an alkanolamine such as diethanolamine, triethanolamine and N-methyldiethanolamine; a hydroxide of an alkali metal such as lithium hydroxide, sodium hydroxide and potassium hydroxide; an ammonium hydroxide (ammonia); a carbonate salt of an alkali metal such as lithium carbonate, sodium carbonate, sodium hydrogencarbonate and potassium carbonate; potassium acetate; an inorganic base such as sodium silicate and disodium phosphate; and the like.

The chelating agent includes, for example, sodium ethylenediamine tetraacetate, sodium nitrilo triacetate, sodium hydroxyethylethylenediamine triacetate, sodium diethylenetriamine pentaacetate, sodium uracil diacetate and the like.

The antirust agent includes, for example, an acidic sulfite salt, sodium thiosulfate, ammonium thioglycolate, diisopropyl ammonium nitrite, pentaerythritol tetranitrate, dicyclohexyl ammonium nitrite and the like.

The water-soluble ultraviolet absorber includes, for example, a sulfonated benzophenone-based compound, a benzotriazole-based compound, a salicyclic acid-based compound, a cinnamic acid-based compound and a triazine-based compound.

The water-soluble polymer compound includes polyvinyl alcohol, a cellulose derivative, a polyamine, a polyimine, and the like.

The dye-dissolving agent includes, for example, ε-caprolactam, ethylene carbonate, urea and the like.

As antioxidant, for example, various organic or metal-complex-based fading inhibitors can be used. The above organic fading inhibitors include hydroquinones, alkoxyphenols, dialkoxyphenols, phenols, anilines, amines, indans, chromans, alkoxyanilines, heterocycles and the like.

The surfactant includes known surfactants such as an anionic, cationic and nonionic surfactant. The anionic surfactant includes an alkyl sulfonate, alkyl carboxylate, α-olefin sulfonate, polyoxyethylene alkyl ether acetate, N-acylamino acid and a salt thereof, N-acylmethyltaurine salt, alkyl sulfate—polyoxyalkyl ether sulfate, alkyl sulfate—polyoxyethylenealkyl ether phosphate, rosin acid soap, caster oil sulfate, lauryl alcohol sulfate, alkylphenol-type phosphoric ester, alkyl-type phosphoric ester, alkylallyl sulfonate, diethylsulfo succinate, diethylhexylsulfo succinic acid, dioctylsulfo succinate and the like. The cationic surfactant includes a 2-vinylpyridine derivative, a poly 4-vinylpyridine derivative and the like. The ampholytic surfactant includes lauryldimethylamino acetic acid betaine, 2-alkyl-N-carboxymethyl-N-hydroxyethylimidazolinium betaine, coconut oil fatty acid amide propyldimethylamino acetic acid betaine, polyoctylpolyaminoethylglycine and others such as an imidazoline derivative. The nonionic surfactant includes ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, polyoxyethylene alkyl ether and polyoxy aralkyl alkyl ether; esters such as polyoxyethylene oleic acid, polyoxyethylene oleate, polyoxyethylene distearate, sorbitan laurate, sorbitan monostearate, sorbitan monooleate, sorbitan sesquiorate, polyoxyethylene monooleate and polyoxyethylene stearate; and acetylene glycols such as 2,4,7,9-tetramethyl-5-decyne-4,7-diol, 3,6-dimethyl-4-octyne-3,6-diol and 3,5-dimethyl-1-hexyn-3-ol (for example, Surfynol 104, 105, 82, 465, and Olfine STG manufactured by Nissin Chemical Industry Co., Ltd.). These ink preparation agents are used alone or in mixture thereof.

An ink composition of the present invention is obtained by mixing the above ingredients in arbitrary order and stirring. Thus obtained ink composition may be filtered with a membrane filter or the like to remove impurities. To adjust black tones, other coloring matters having various hues may be mixed. In that case, besides the azo compound of the present invention shown by Formula (1), coloring matters of black having other hues, yellow, magenta, cyan and other colors can be used by mixing them.

An ink composition of the present invention can be used in various fields, and is suitable for a water-based ink for writing, a water-based printing ink, an information recording ink, and the like, particularly preferably for an ink for inkjet, and suitably used in an inkjet recording method of the present invention described later.

A method for inkjet recording of the present invention will be explained hereinafter. A method for inkjet recording of the present invention is characterized by using the above ink composition to perform recording. In the method for inkjet recording of the present invention, recording is performed on image receiving materials using an ink for inkjet containing the above ink composition, an ink nozzle and the like to be used on that occasion are not especially limited and can be selected appropriately according to the purpose, and known methods such as an electric charge controlling method to discharge ink utilizing electrostatic induction force, a drop-on-demand method (pressure pulse method) to make use of vibration pressure of piezoelectric elements, an acoustic inkjet method to discharge ink by radiation pressure generated by irradiation of acoustic beam to ink, wherein the acoustic beam is converted from electric signals, a thermal inkjet method (Bubble Jet (registered trademark)) to make use of pressure of bubbles generated by heating ink, and the like can be used.

The above inkjet recording method also includes a method for injecting a number of tiny droplets of a low concentration ink called a photo ink, a method for improving image quality using multiple inks having substantially the same hue and different concentration, and a method for using a colorless and transparent ink.

A colored article of the present invention is one colored with the above compound of the present invention or an ink composition containing thereof, more preferably one colored by an inkjet printer using an ink composition of the present invention. Articles to be colored include, for example, sheet for information transmission such as paper, film and the like, textile or cloth (cellulose, nylon, wool and the like), leather, substrates for color filter and the like. Sheet for information transmission includes preferably surface-treated one, specifically one provided with an ink receiving layer on the substrate of paper, synthetic paper, film and the like. An ink receiving layer is provided, for example, by impregnating or coating cationic polymer on the above substrate, or by coating porous white inorganic substance such as porous silica, aluminasol or special ceramics and the like which can absorb coloring matter in the ink on the surface of the above substrate, together with a hydrophilic polymer such as polyvinylalcohol, polyvinylpyrrolidone and the like. Such articles as provided with an ink receiving layer are usually called inkjet paper (film), glossy paper (film) and the like, and such typical commercial items include, for example, Pictorico (manufactured by Asahi Glass Co., Ltd.), Professional Photopaper, Super Photopaper, and Matte Photopaper (all manufactured by Canon Inc.), PM photograph paper (glossy), PM Matte paper (both manufactured by SEIKO-EPSON CORPORATION), Premium Plus Photo Paper, Premium Glossy Film and Photo Paper (all manufactured by Hewlett Packard Japan, Ltd.), PhotoLikeQP (manufactured by KONICA Corporation), and the like. In addition, plain paper can be used.

Among them, it is especially known that discoloration or fading of an image recorded on a record-receiving material the surface of which is applied with porous white inorganic material is to be proceeded by ozone gas, but an ink composition of the present invention is so superior in ozone gas fastness that it has an effect especially in recording on such a record-receiving material.

For recording on a record-receiving material in the inkjet recording method of the present invention, for example, a container containing the above ink composition may be set on the predefined position of an inkjet printer and recording may be performed on a record-receiving material in a conventional manner. In the inkjet recording method of the present invention, a black ink composition of the present invention can be used in combination with a known and used magenta ink composition, a cyan ink composition, a yellow ink composition, if required, a green ink composition, a blue (or violet) ink composition and a red ink composition. Each of ink compositions is injected into each of containers and the containers, as well as containers containing a water-based black ink composition for inkjet recording of the present invention, are loaded in the predefined positions in the inkjet printer to be used. An inkjet printer includes, for example, a printer of piezo method utilizing mechanical vibration, a printer of Bubble Jet (registered trademark) method utilizing bubbles generated by heating, and the like.

An azo compound of the present invention is excellent in water-solubility, and an ink composition comprising this azo compound of the present invention does not exhibit crystal deposition, change in physical property, color change nor the like after storage for a long period of time, and exhibit favorable storage stability. And a black ink liquid for recording which contains an azo compound of the present invention is used for inkjet recording and for writing tools, and when a printing is recorded on a plain paper and an inkjet paper, a black color with high printing density is exhibited and excellent in ozone gas fastness, light fastness, moisture fastness and color rendering properties.

EXAMPLES

Hereinafter, the present invention will be more specifically explained by Examples, but the present invention should not be limited thereto. In this connection, "part" and "%" in the specification are based on mass unless otherwise specified.

Example 1

(1) After 20.1 parts of 2-amino-5-naphthol-1,7-disulfonic acid and 12.6 parts of p-toluenesulfonylchloride were subjected to reaction at pH 8.0 to 8.5, at 70° C. for 1 hour, the reaction product was precipitated (salting-out) by the addition of sodium chloride under acidic conditions. The precipitated crystal was filtration-separated to obtain 28.4 parts of a compound of Formula (16). This was dissolved in 300 parts of water while adjusting the pH at 6.0 to 8.0 with sodium carbonate, and after 18.7 parts of 35% hydrochloric acid was added to said solution, the temperature of said solution was adjusted at 0 to 5° C. and 10.7 parts of 40% aqueous solution of sodium nitrite was added thereto to diazotize.

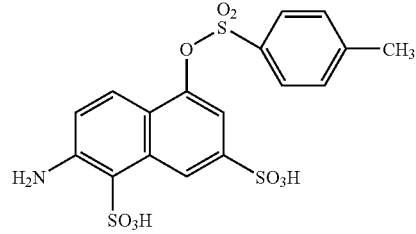

(16)

[KA 15]

To this diazo suspension was added a solution of 19.1 parts of 4-amino-5-hydroxynaphthalene-1,7-disulfonic acid suspended in 200 parts of water, followed by stirring for 12 hours while maintaining the pH value of the obtained suspension at 2.4 to 2.8 with sodium carbonate, at 10 to 20° C. Subsequently, the pH value was adjusted at 7.0 to 8.5 with sodium carbonate to dissolve and a solution containing a monoazo compound of Formula (17) was obtained.

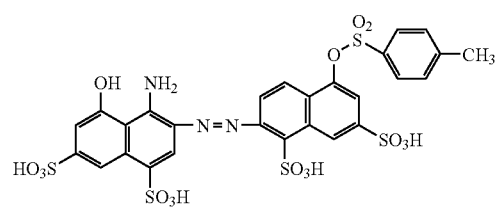

(17)

[KA 15]

(2) In 150 parts of water 14.4 parts of sodium 4-nitroaniline-2-sulfonate was dissolved, and 18.8 parts of 35% hydrochloric acid and 10.6 parts of 40% aqueous solution of sodium nitrite were added hereto at 0 to 5° C. to diazotize. This diazo suspension was added dropwise into a solution containing a mono azo compound of Formula (17) obtained by the above reaction, while maintaining the pH of said solution at 8.0 to 9.0 with sodium carbonate at 10 to 20° C. After completion of the dropwise addition, it was stirred at pH 8.0 to 9.0, at 15 to 30° C. for 2 hours and salted-out by the addition of sodium chloride, and the precipitated crystal was filtration-separated, to obtain a wet cake containing a compound of the following Formula (18).

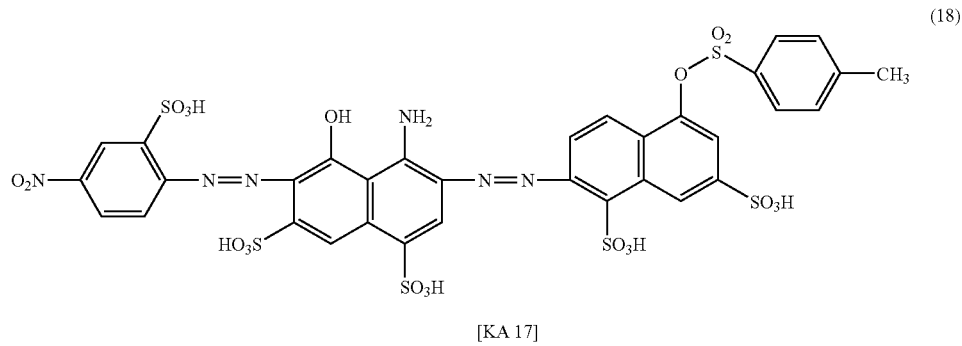

[KA 17] (18)

The above obtained wet cake was dissolved in 400 parts of water and said solution was heated to 70° C., followed by stirring for 1 hour while maintaining the pH value at 10.5 to 11.0 with sodium hydroxide. After cooling it to the room temperature, the pH was adjusted at 7.0 to 8.0 with 35% hydrochloric acid, said solution was salted-out by the addition of sodium chloride and the precipitated crystal was filtration-separated to obtain a wet cake containing a compound of Formula (19).

This diazo suspension was added dropwise, at 10 to 25° C. while maintaining the pH value of said solution at 8.0 to 9.0 with lithium hydroxide, into a solution where a wet cake containing a compound of the above Formula (19) was dissolved in 400 parts of water. After completion of the dropwise addition, it was stirred at 15 to 30° C. at pH 8.0 to 9.0 for 2 hours and subjected to salting-out by the addition of lithium

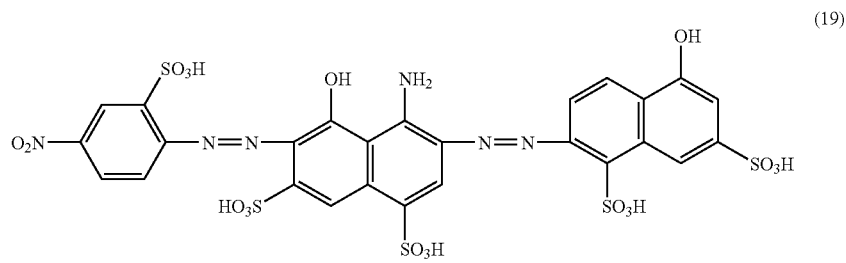

[KA 18] (19)

(3) In 170 parts of water 17.0 parts of a compound of the following Formula (20) was dissolved with the pH adjusted to 7.0 to 8.0 by the addition of lithium hydroxide, and 17.4 parts of 35% hydrochloric acid and 8.7 parts of 40% sodium nitrite aqueous solution were added thereto at 0 to 5° C. to diazotize.

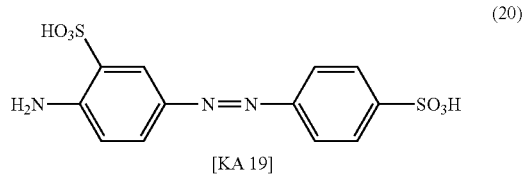

[KA 19] (20)

chloride, and the precipitated crystal was filtration-separated. The obtained wet cake was dissolved in 400 parts of water, which was then crystallized by the addition of 1000 parts of 2-propanol, and the obtained crystal was filtration-separated. Further, the obtained wet cake was dissolved in 300 parts of water, which was then crystallized again by the addition of 900 parts of 2-propanol, and the obtained crystal was filtration-separated and dried to obtain 49.0 parts of an azo compound of the following Formula (21) of the present invention (a compound No. 1 in Table 2) as a mixed salt of lithium and sodium. The maximum absorption wavelength ($\lambda$ max) of this compound in water at pH 9 was 590 nm, and solubility in water was no less than 100 g/l.

(21)

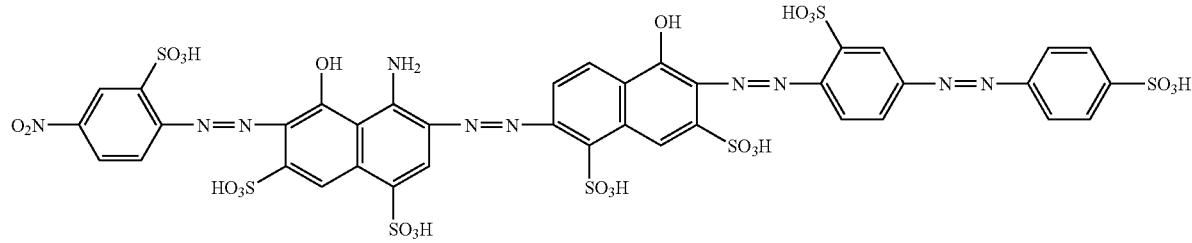

[KA 20]

Example 2

In the same manner as in Example 1 except that 14.4 parts of sodium 2-nitroaniline-4-sulfonate was used instead of 14.4 parts of sodium 4-nitroaniline-2-sulfonate in (2) of Example 1, 47.0 parts of an azo compound of the following Formula (22) of the present invention (a compound No. 3 in Table 2) was obtained as a mixed salt of lithium and sodium. The maximum absorption wavelength (λ max) of this compound in water at pH 9 was 592 nm, and solubility in water was no less than 100 g/l.

Also, in the same manner as in Example 1 except that 5-nitroanthranilic acid is used instead of sodium 4-nitroaniline-2-sulfonate in (2) of Example 1, a compound of No. 2 in Table 2 can be obtained.

Otherwise, in the same manner as in Example 1 except that 2-amino-5-naphthol-7-sulfonic acid is used instead of 2-amino-5-naphthol-1,7-disulfonic acid in (1) of Example 1, a compound of No. 6 in Table 2 can be obtained.

Example 3

(1) In 100 parts of water 11.5 parts of sodium 4-nitroaniline-2-sulfonate was dissolved, and 14.1 parts of 35% hydrochloric acid and 8.6 parts of 40% sodium nitrite aqueous solution was added hereto at 0 to 5° C. to diazotize. While maintaining the obtained diazo suspension at 10 to 15° C., a solution (pH 5.0 to 6.0) where 12.3 parts of a compound of the following Formula (23) dissolved in 100 parts of water was added dropwise thereto. After completion of the dropwise addition, the aqueous solution of sodium carbonate was added dropwise over 1 hour, the pH of said suspension was adjusted at 6.0 to 7.0, and then it was stirred at 15 to 20° C. for 2 hours at pH 6.0 to 7.0. Sodium chloride was added to the obtained reaction solution for salting out and the precipitated crystal was filtration-separated to obtain a wet cake containing a compound of the following Formula (24). In this connection, the compound of Formula (23) was synthesized by the method described in Example 2 in JP 2004-083492 A. And the solution of said compound was obtained by adding (22)

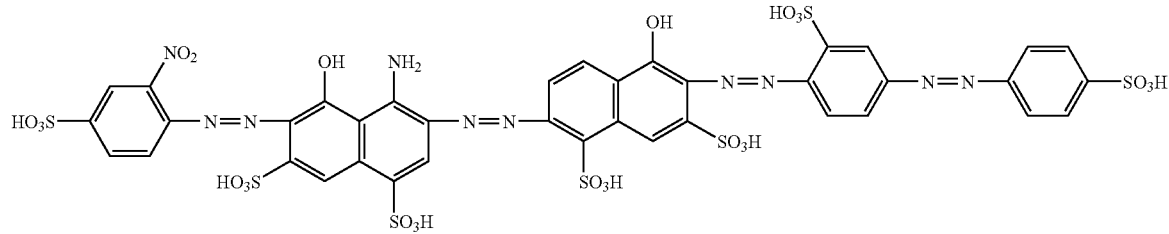

[KA 21]

sodium hydroxide to a suspension containing said compound in water and dissolving said compound in water at pH 5.0 to 6.0.

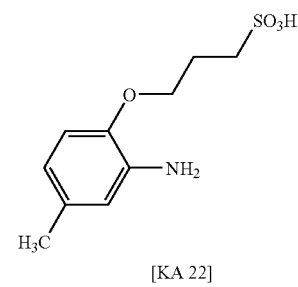

(23)

[KA 22]

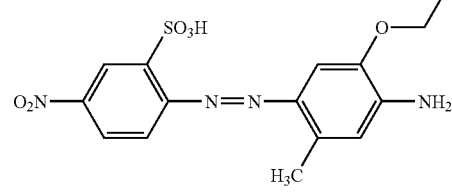

(24)

[KA 23]

(2) In the same manner as in Example 1 except that a wet cake containing the compound of Formula (24) obtained in the above reaction was used instead of 17.0 parts of the compound of Formula (20) in (3) of Example 1, 50.1 parts of an azo compound of the following Formula (25) of the present invention (a compound No. 16 in Table 4) was obtained as a mixed salt of lithium and sodium. The maximum absorption wavelength ($\lambda$ max) of this compound in aqueous solution at pH 9 was 615 nm, and solubility in water was no less than 100 g/l.

Example 4

(1) In the same manner as in (1) of Example 3 except that 10.4 parts of 5-sulfo anthranilic acid was used instead of 11.5 parts of sodium 4-nitroaniline-2-sulfonate in (1) of Example 3, a wet cake containing a compound of the following Formula (26) was obtained.

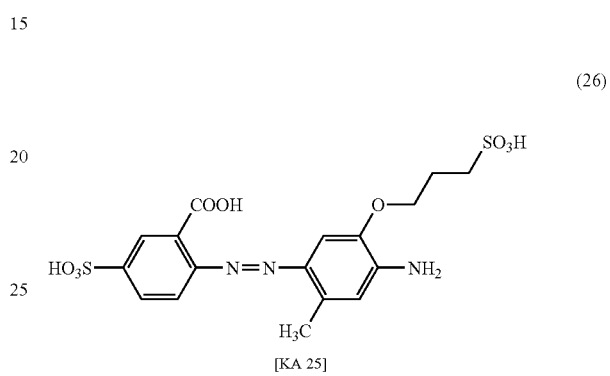

(26)

[KA 25]

(2) In the same manner as in Example 1 except that a wet cake containing the compound of Formula (26) obtained in the above reaction was used instead of 17.0 parts of the compound of Formula (20) in (3) of Example 1, 44.1 parts of an azo compound of the following Formula (27) of the present invention (a compound No. 21 in Table 4) was obtained as a mixed salt of lithium and sodium. The maximum absorption wavelength ($\lambda$ max) of this compound in aqueous solution at pH 9 was 608 nm, and solubility in water was no less than 100 g/l.

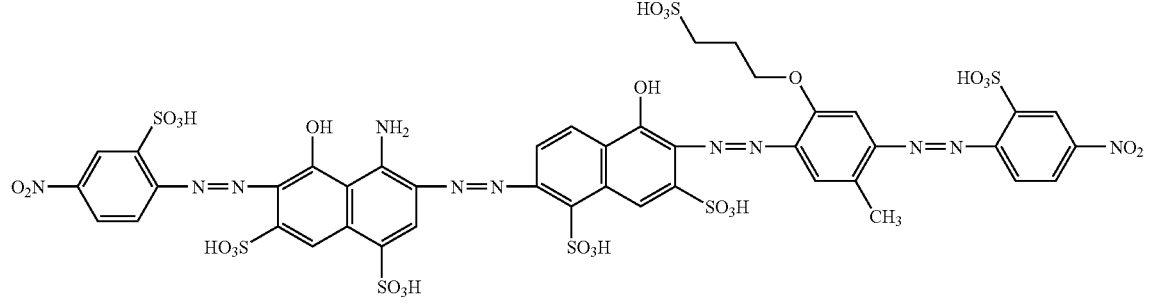

(25)

[KA 24]

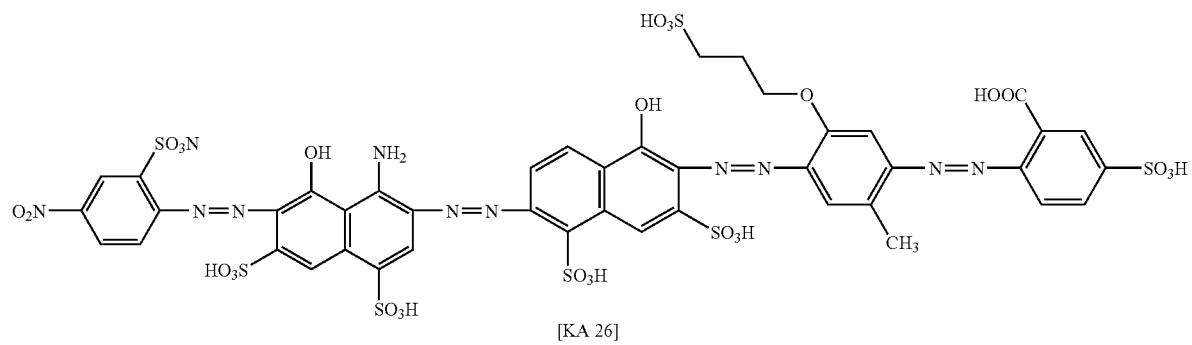

[KA 26]

Examples 5, 6, 7 and 8

(A) Preparation of an Ink

A black ink composition of the present invention is prepared by mixing the components described below, followed by filtering with a 0.45 μm membrane filter to eliminate impurities. Ion exchange water was used as water. The pH in preparing the ink was adjusted at 8 to 9 with ammonium hydroxide.

[Table 5]

TABLE 5

| | |
|---|---|
| Compound obtained in the above Example (using one subjected to desalting treatment) | 5.0 parts |
| Glycerine | 5.0 parts |
| Urea | 5.0 parts |
| N-methyl-2-pyrrolidone | 4.0 parts |
| Isopropyl alcohol | 3.0 parts |
| Butylcarbitol | 2.0 parts |
| Surfactant (Surfynol 105 manufactured by Nissin Chemical Industry Co., Ltd.) | 0.1 part |
| Water + ammonium hydroxide | 75.9 parts |
| Total | 100.0 parts |

In Table 5, "compound obtained in the above Example" means respectively the compound of Formula (21) obtained in Example 1 for Example 5, the compound of Formula (22) obtained in Example 2 for Example 6, the compound of Formula (25) obtained in Example 3 for Example 7, the compound of Formula (27) obtained in Example 4 for Example 8. These water-based ink compositions did not exhibit precipitation separation during storage thereof, nor changed physical property after storage for a long period of time.

(B) Inkjet Printing

Using each ink composition obtained above, by an inkjet printer (Trade name BJ-S630 from Canon Inc.), inkjet recording was conducted on three types of paper of a Plain Paper (LBP PAPER LS-500 from Canon Inc.), Professional Glossy Paper PR (Professional Photopaper PR-101 from Canon Inc.), and Professional Glossy Paper PM (PM photograph paper (glossy), KA420PSK from SEIKO EPSON CORPORATION).

In printing, an image pattern was made so as to obtain gradations of several stages in reflection density, and a black colored print of half tone was obtained. As a gray scale mode is used in printing, any recording solution of yellow, cyan, and magenta is not used together with a black colored recording solution. Among testing methods described below, for evaluation of printing density which is an item to be evaluated using a calorimeter, the highest portion of this D value was used in measuring reflection density D value of a print. And, in measuring of light fastness and ozone gas fastness which are similarly items to be evaluated using a calorimeter, measurement was conducted using a portion of gradations wherein reflection density, D value, of a print before testing is closest to 1.0.

(C) Evaluation of a Recorded Image

Concerning a recorded image according to a water-based ink composition of the present invention, evaluation was conducted on 3 items of printing density (reflection density), change in hue after light fastness testing, and change in hue after ozone gas fastness testing. In this connection, the ozone gas fastness test was conducted using only Professional Glossy Papers PR and PM. The results are shown in Table 6. The testing methods are shown below.

1) Evaluations of Printing Density

Printing density (reflection density) of a recorded image was measured using GRETAG SPM50 (manufactured by GretagMacbeth AG), and reflection density D value was calculated. Judgment criteria are shown below.

| | |
|---|---|
| ○: a Plain Paper: $1.2 \leq D$, | a Glossy Paper: $2.0 \leq D$ |
| △: a Plain Paper: $1.0 \leq D < 1.2$, | a Glossy Paper: $1.8 \leq D < 2.0$ |
| ×: a Plain Paper: $D < 1.0$, | a Glossy Paper: $D < 1.8$ |

2) Light Fastness Test

Using a xenon weatherometer Ci4000 (manufactured by ATLAS Electric Devices Co.), a printing sample, in which a glass plate having a thickness of 2 mm was set up so as to allow an air layer to be produced, was irradiated for 50 hours at illuminance of 0.36 W/m². After the test, using the above described calorimetric system, color measurement was conducted. Residual percentage of a coloring matter was calculated by (reflection density after the test/reflection density before the test)×100(%) to evaluate. Judgment was conducted by the criteria as shown below.

○: residual percentage: no less than 95%
Δ: residual percentage: less than 95% and no less than 90%
x: residual percentage: less than 90%

3) Ozone gas fastness test

Using an ozone weatherometer (manufactured by Suga Test Instruments Co., Ltd.), a printing sample was left for 6 hours under the conditions of ozone concentration of 40 ppm, humidity of 60% RH and temperature of 24° C. After the test, using the above described calorimetric system, ΔE (color difference) before and after the test was measured. Judgment was conducted by the criteria as shown below.

○: ΔE is less than 15
Δ: ΔE is no less than 15 and less than 30
x: ΔE is no less than 30

Comparative Example 1

In the same manner as in Examples 5, 6, 7 and 8 except that, for comparison, a coloring matter (the following Formula (28)) of 1 in Table 1-1 of Patent Literature 1 was used as a water-soluble coloring matter for inkjet instead of a compound of the present invention, an ink composition was prepared employing the ink-composition of the above Table 5. The evaluation results of printing density, light fastness, and ozone gas fastness of a recorded image obtained are shown in Table 6.

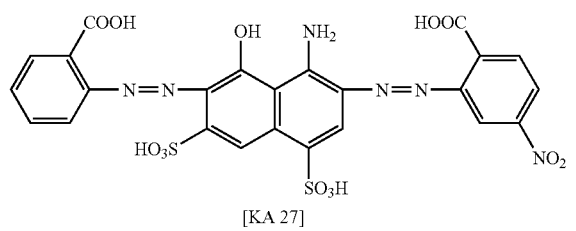

[KA 27]

Comparative Example 2

In the same manner as in Examples 5, 6, 7 and 8 except that, for comparison, a coloring matter AN-250 (the following Formula (29)) described in Example 1 of Patent Literature 3 was used as a water-soluble coloring matter for inkjet instead of a compound of the present invention, an ink composition was prepared employing the ink-composition of the above Table 5. The evaluation results of printing density, light fastness, and ozone gas fastness of a recorded image obtained are shown in Table 6.

TABLE 6

| | Printing density | Light fastness | Ozone gas fastness |
|---|---|---|---|
| Example 5 (Formula (21)) | | | |
| Plain Paper | ○ | ○ | — |
| Professional Glossy Paper PR | ○ | ○ | Δ |
| Professional Glossy Paper PM | ○ | ○ | ○ |
| Example 6 (Formula (22)) | | | |
| Plain Paper | ○ | ○ | — |
| Professional Glossy Paper PR | ○ | ○ | Δ |
| Professional Glossy Paper PM | ○ | ○ | ○ |
| Example 7 (Formula (25)) | | | |
| Plain Paper | ○ | ○ | — |
| Professional Glossy Paper PR | ○ | ○ | Δ |
| Professional Glossy Paper PM | ○ | ○ | ○ |
| Example 8 (Formula (27)) | | | |
| Plain Paper | ○ | ○ | — |
| Professional Glossy Paper PR | ○ | ○ | Δ |
| Professional Glossy Paper PM | ○ | ○ | ○ |
| Comparative Example 1 (Formula (28)) | | | |
| Plain Paper | ○ | Δ | — |
| Professional Glossy Paper PR | ○ | Δ | x |
| Professional Glossy Paper PM | ○ | ○ | Δ |
| Comparative Example 2 (Formula (29)) | | | |
| Plain Paper | ○ | Δ | — |
| Professional Glossy Paper PR | ○ | Δ | x |
| Professional Glossy Paper PM | ○ | ○ | x |

Judging from Table 6, it is found that an ink composition comprising an azo compound of the present invention has high printing density, and is excellent in light fastness and ozone gas fastness as compared with a conventional black colored dye (Comparative Examples).

In addition, it is possible to design an ink having high concentration because an azo compound of the present invention has high solubility in water and an aqueous solution where said azo compound is dissolved has excellent stability.

INDUSTRIAL APPLICABILITY

An ink composition comprising an azo compound of the present invention is used suitably as a black ink liquid for inkjet recording and writing tools.

The invention claimed is:

1. An azo compound represented by Formula (1) as shown below or a salt thereof,

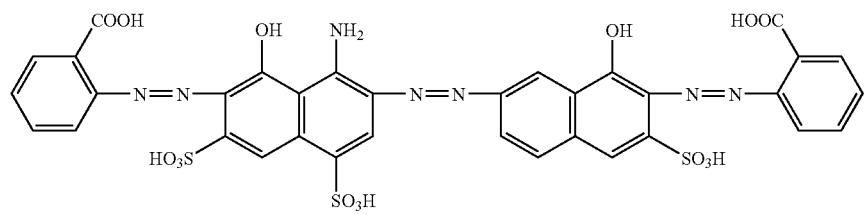

[KA 28]

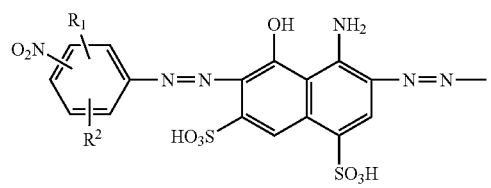

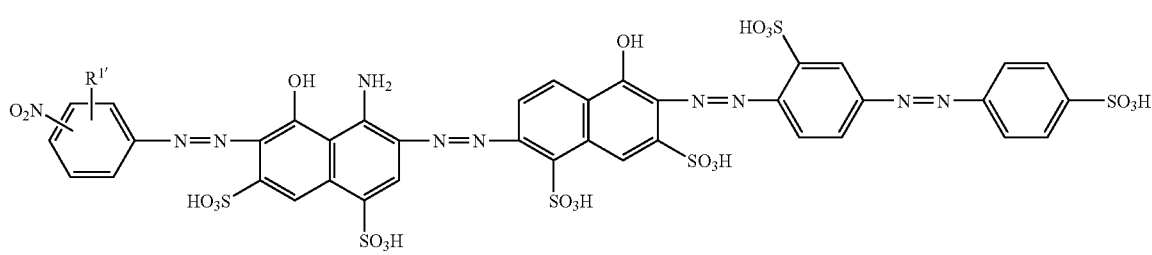

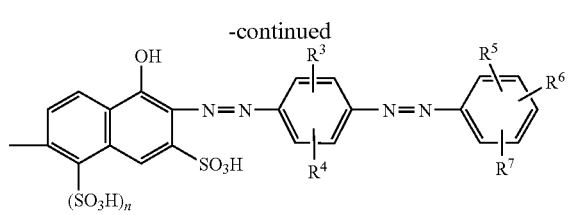

wherein, each of $R^1$, $R^2$, $R^5$, $R^6$ and $R^7$ independently represents a hydrogen atom, a halogen atom, a cyano group, a hydroxyl group, a carboxyl group, a sulfo group, a sulfamoyl group, an N-alkylaminosulfonyl group, an N-phenylaminosulfonyl group, a (C1 to C4) alkylsulfonyl group which may be substituted by a hydroxyl group, a phospho group, a nitro group, an acyl group, a ureide group, a (C1 to C4) alkyl group which may be substituted by a hydroxyl group or a (C1 to C4) alkoxy group, a (C1 to C4) alkoxy group which may be substituted by a hydroxyl group, a (C1 to C4) alkoxy group, a sulfo group or a carboxyl group, an acylamino group, an alkylsulfonylamino group or a phenylsulfonylamino group which may be substituted by a halogen atom, an alkyl group or a nitro group, each of $R^3$ and $R^4$ independently represents a hydrogen atom, a halogen atom, a cyano group, a carboxyl group, a sulfo group, a nitro group, a (C1 to C4) alkyl group which may be substituted by a hydroxyl group or a (C1 to C4) alkoxy group, a (C1 to C4) alkoxy group which may be substituted by a hydroxyl group, a (C1 to C4) alkoxy group, a sulfo group or a carboxyl group, an acylamino group, an alkylsulfonylamino group or a phenylsulfonylamino group which may be substituted by a halogen atom, an alkyl group or a nitro group, and n represents 0 or 1, respectively.

2. The azo compound or the salt thereof according to claim 1 wherein $R^1$ is a carboxyl group or a sulfo group, $R^2$ is a hydrogen atom, $R^6$ is a carboxyl group or a sulfo group, and n is 1.

3. The azo compound or the salt thereof according to claim 1 or 2, wherein $R^1$ is a sulfo group, the substitution position of a nitro group is at the para-position to an azo group when the substitution position of $R^1$ is at the ortho-position to an azo group, and the substitution position of a nitro group is at the ortho-position to an azo group when the substitution position of $R^1$ is at the para-position to an azo group.

4. The azo compound or the salt thereof according to any one of claim 1 or 2, wherein $R^3$ is a sulfo group, $R^4$ is a hydrogen atom, $R^5$ is a hydrogen atom, a carboxyl group or a sulfo group, and $R^7$ is a hydrogen atom.

5. An azo compound represented by Formula (2) as shown below or a salt thereof, wherein, $R^{1'}$ is a sulfo group, the substitution position of a nitro group is at the para-position to an azo group when the substitution position of $R^{1'}$ is at the ortho-position to an azo group, and the substitution position of a nitro group is at the ortho-position to an azo group when the substitution position of $R^{1'}$ is at the para-position to an azo group.

6. An ink composition comprising at least one kind of the azo compound or the salt thereof according to any one of claim 1 or 5.

7. A recording method for inkjet printing comprising applying the ink composition according to claim 6 to record-receiving materials.

8. The recording method for inkjet printing according to claim 7 wherein the record-receiving material in the recording method for inkjet printing is a sheet for transmitting information.

9. The recording method for inkjet printing characterized by that the sheet for transmitting information according to claim 8 comprises porous white inorganic substance.

10. An inkjet printer which is loaded with a container comprising the ink composition according to claim 6.

11. A colored article which is colored with the azo compound or the salt thereof according to claim 1 or 5.

12. The azo compound or salt thereof according to claim 1 or 2, wherein $R^1$ is a sulfo group, the substitution position of the nitro group is at the para-position to the azo group when the substitution position of $R^1$ is at the ortho-position to the azo group, and the substitution position of the nitro group is at the ortho-position to the azo group when the substitution position of $R^1$ is at the para-position to the azo group, and $R^3$ is a sulfo group, $R^4$ is a hydrogen atom, $R^5$ is a hydrogen atom, a carboxyl group, or a sulfo group, and $R^7$ is a hydrogen atom.

* * * * *